United States Patent
Teller

(10) Patent No.: US 10,679,190 B1
(45) Date of Patent: Jun. 9, 2020

(54) CONTEXT-DEPENDENT INFERRED SOCIAL NETWORK

(71) Applicant: X Development LLC, Mountain View, CA (US)

(72) Inventor: Eric Teller, San Francisco, CA (US)

(73) Assignee: X Development LLC, Mountain View, CA (US)

(*) Notice: Subject to any disclaimer, the term of this patent is extended or adjusted under 35 U.S.C. 154(b) by 1117 days.

(21) Appl. No.: 15/041,883

(22) Filed: Feb. 11, 2016

Related U.S. Application Data

(63) Continuation of application No. 13/292,071, filed on Nov. 8, 2011, now abandoned.

(51) Int. Cl.
| | |
|---|---|
| *G06F 11/32* | (2006.01) |
| *G06Q 10/10* | (2012.01) |
| *G06Q 50/00* | (2012.01) |
| *G06F 16/16* | (2019.01) |
| *G06F 16/335* | (2019.01) |

(Continued)

(52) U.S. Cl.
CPC ......... *G06Q 10/1093* (2013.01); *G06F 11/32* (2013.01); *G06F 16/162* (2019.01); *G06F 16/337* (2019.01); *G06F 16/3326* (2019.01); *G06Q 10/107* (2013.01); *G06Q 50/01* (2013.01); *H04W 12/06* (2013.01)

(58) Field of Classification Search
CPC ..... H04W 12/06; G06Q 20/322; G06Q 20/12; G06Q 20/0453; G06Q 10/10; G06Q 30/02; G06Q 30/0207; G06Q 50/01; G06Q 10/107; G06F 11/32; G06F 16/337; G06F 16/3326; H04L 12/189; H04L 12/1895

See application file for complete search history.

(56) References Cited

U.S. PATENT DOCUMENTS

| | | |
|---|---|---|
| 7,797,732 B2 | 9/2010 | Tam et al. |
| 7,904,511 B2 | 3/2011 | Ryan et al. |

(Continued)

OTHER PUBLICATIONS

Kirkpatrick, Marshall, Mapping Our Friendships Over Time and Space: The Future of Social Network Analysis, available online at: http:/www.readwriteweb.com/archives/your_social_graph_researchers_identify_new_opportu.php (last visited Nov. 1, 2011).

(Continued)

*Primary Examiner* — Kyung H Shin
(74) *Attorney, Agent, or Firm* — McDonnell Boehnen Hulbert & Berghoff LLP

(57) ABSTRACT

Exemplary methods and systems may help to provide content to a user and/or take to take actions on user's behalf, based on a context-specific user-network that includes surrogates for a user in a certain context. An exemplary method may involve: (a) determining a context associated with a first user-profile; (b) determining a context-specific user-network for the first user-profile in the determined context, wherein the context-specific user-network comprises one or more user-profiles that are surrogates for the first user-profile in the determined context; (c) using historical context-to-action data for one or more of the surrogate user-profiles as a basis for determining a context-based action that is appropriate in the determined context; and (d) causing a computing device associated with the first user-profile to initiate the context-based action.

24 Claims, 7 Drawing Sheets

(51) Int. Cl.
*G06F 16/332* (2019.01)
*H04W 12/06* (2009.01)

(56) References Cited

U.S. PATENT DOCUMENTS

| | | | |
|---|---|---|---|
| 2009/0234876 A1* | 9/2009 | Schigel | G06Q 10/107 |
| 2009/0249451 A1 | 10/2009 | Su et al. | |
| 2010/0180001 A1* | 7/2010 | Hardt | G06F 11/32 |
| | | | 709/207 |
| 2012/0203697 A1* | 8/2012 | Morgan | H04W 12/06 |
| | | | 705/44 |
| 2013/0006738 A1* | 1/2013 | Horvitz | G06Q 30/0207 |
| | | | 705/14.16 |

OTHER PUBLICATIONS

Sorniotii, Alessandro, Secret Interest Groups (SIGs) in Social Networks with an Implementation on Facebook, SAC '10 Proceedings of the 2010 ACM Symposium on Applied Computing, Mar. 22-26, 2010, Switzerland.

* cited by examiner

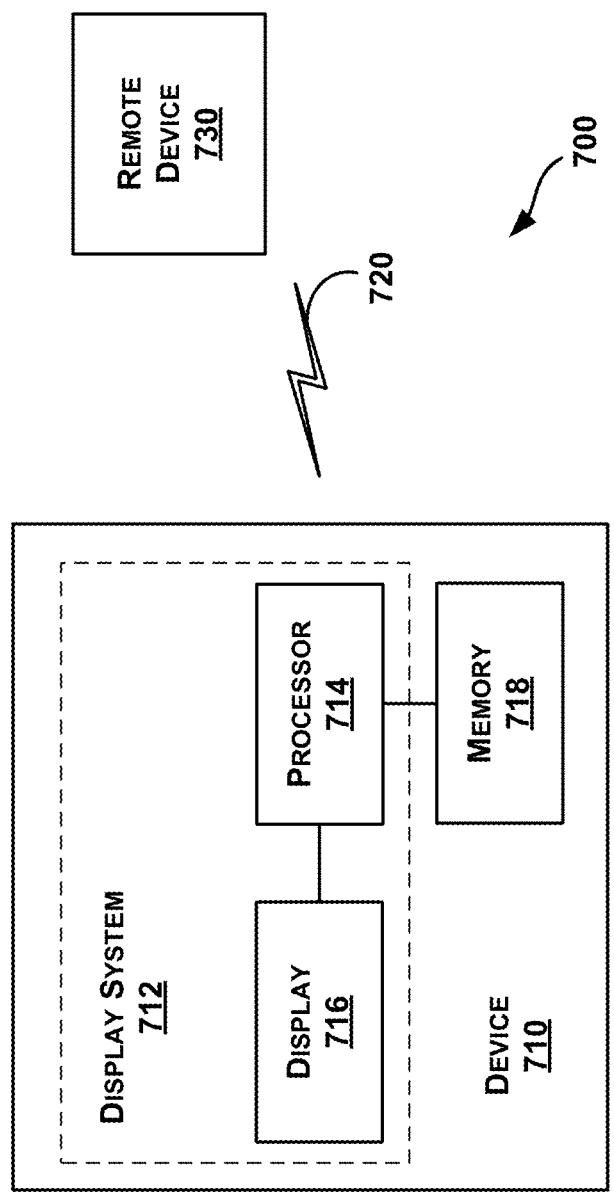

CONTEXT-DEPENDENT INFERRED SOCIAL NETWORK

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

As such, people have moved many of their activities online. For example, online social networks are becoming one of the primary ways that people interact with one another. Further, consumer purchasing made via the Internet are prevalent. Many other examples exist as well. With people increasingly engaging in activities and transactions online, a wealth of information can be learned from their online activities and transactions, if people elect to share their information with central sources that can aggregate and analyze such data.

SUMMARY

In one aspect, an exemplary computer-implemented method may involve: (a) determining a context associated with a first user-profile; (b) determining a context-specific user-network for the first user-profile in the determined context, wherein the context-specific user-network comprises one or more user-profiles that are surrogates for the first user-profile in the determined context; (c) using historical context-to-action data for one or more of the surrogate user-profiles as a basis for determining a context-based action that corresponds to the determined context; and (d) causing a computing device associated with the first user-profile to initiate the context-based action.

In another aspect, an exemplary computing system may include a non-transitory computer-readable medium and program instructions stored on the non-transitory computer-readable medium. The program instructions may be executable by at least one processor to: (a) determine a context associated with a computing device, wherein the computing device is associated with a first user-profile, and wherein the first user-profile is associated with a social network; (b) determine a context-specific user-network for the first user-profile based on the determined context, wherein the context-specific user-network comprises one or more user-profiles that are surrogates for the first user-profile in the determined context; (c) use historical context-to-action data for one or more of the surrogate user-profiles as a basis to determine a context-based action that corresponds to the determined context; and (d) cause a computing device associated with the first user-profile to initiate the context-based action.

In yet another aspect, an exemplary computer-implemented method may involve: (a) receiving an information request that is associated with a first user-profile; (b) determining a context of the information request; determining a context-specific user-network for the first user-profile in the context of the information request, wherein the context-specific user-network comprises one or more user-profiles that are surrogates for the first user-profile in the context of the information request; (c) using historical context-to-action data for one or more of the surrogate user-profiles as a basis for determining a context-based response to the information request that corresponds to the context of the information request; and (d) sending the context-based response to a computing device associated with the first user-profile.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 7 illustrates a schematic drawing of a computing device according to an exemplary embodiment.

DETAILED DESCRIPTION

Figure 1:
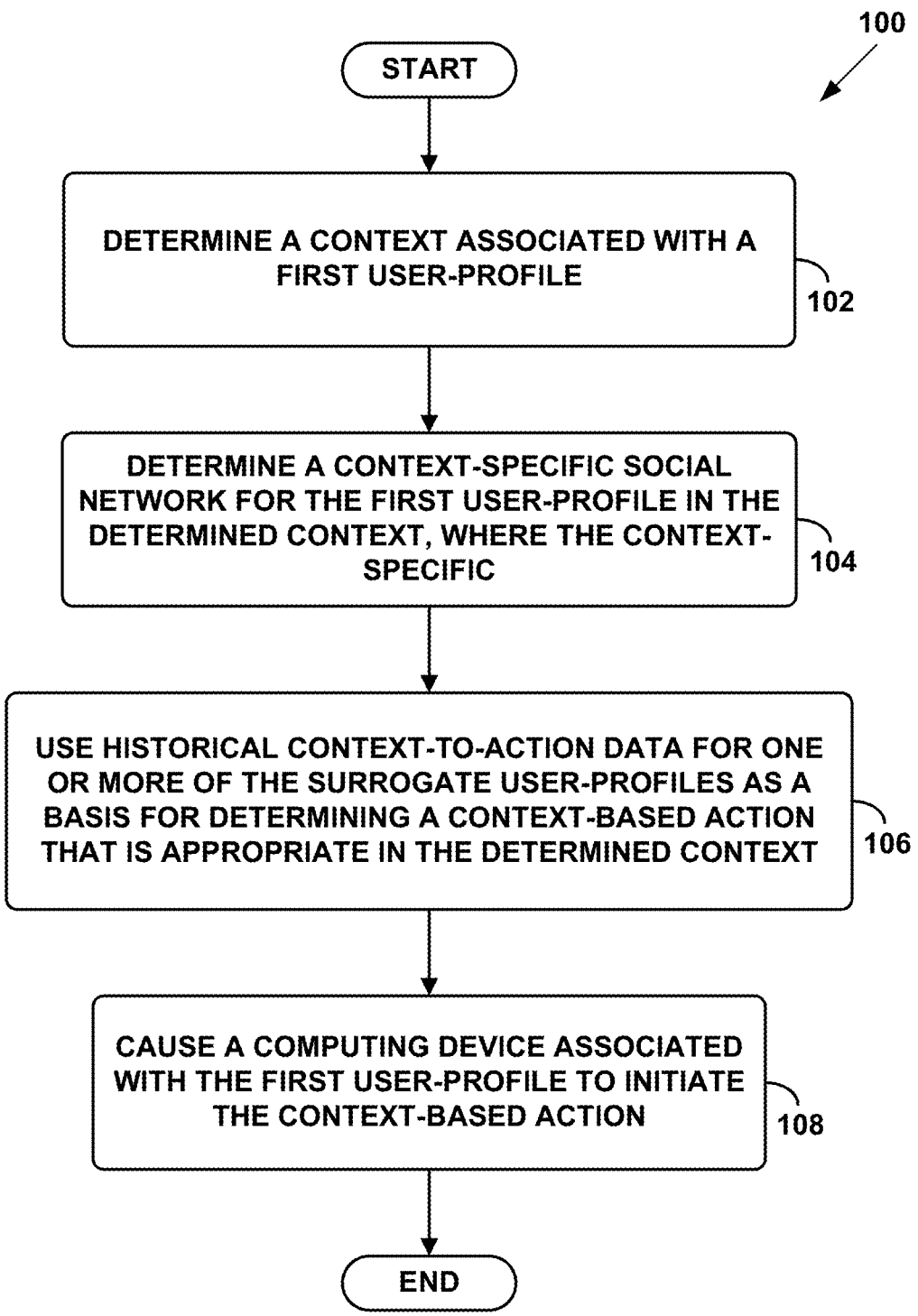
FIG. 1 is a simplified flow chart illustrating a method according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

In modern society, online social networks have become extremely popular. Individuals and businesses may access these social networks via a web site, where they may register for an account on the social network. Once a person has registered, they may set up a profile that serves as an online representation of them to other users on the social network. Further, once a user sets up a user-profile, the may form a network of associated users (e.g., "friends") on the social network through a process of sending association requests (e.g., "friend requests") to other users who must confirm the requests and/or confirming association requests received from other users.

Currently, information associated with a given user's network of associated users on a social network may be used to customize a user's experience on the social network. In particular, since a user has explicitly indicated a relationship to such users by sending or accepting an association request, it may be assumed that the user shares some interests or otherwise has things in common with an associated user.

An exemplary embodiment goes beyond looking at a user's explicitly-indicated social network, and determines an inferred network of users, which can include users with him the user has no explicit association with. In particular, an exemplary embodiment may determine a context-specific user-network that includes surrogates for a user in a given context, and then take on action on behalf of the user based on information learned from the user's surrogates. This context-specific user-network may be inferred based on similarities between the user and each surrogate, rather than defined by a relationship that is explicitly indicated by the user.

More specifically, in an exemplary embodiment, a surrogate is another user (or from the perspective of a system carrying out an exemplary method, another user-profile), with which a given user may or may not have interacted with, and which is determined to have similarities to the given user in a certain context. For example, the system may determine based on a first user's calendar entries, social networking posts, micro-blogs, and so on, that the first user is an avid cyclist who lives in a certain city and prefers cycling on weekends. Accordingly, the system may consider a second user who is also an avid cyclist in the same city, and possibly who also prefers cycling on weekends, to be surrogate for the first user (regardless of whether the first and second users know each other or have ever interacted) in contexts related to cycling.

Provided with an aggregation of context information for a context-specific user-network in a particular context, an exemplary method may be used to customize a given user's experience by cross-referencing the user's current context against historical context information provided by the user's inferred social network. For instance, continuing the above example, if the first user sends an email to a friend indicating they would like to buy a new bike, the system might look to surrogates, such as the second user, to provide suggestions of what bike to buy, where to buy the bike, etc.

In a further aspect, since surrogates are selected based on context, a given user might be a surrogate in one context, but not in another. For instance, the first user above may have three children, while the second user may have no children. As such the second user may be considered a surrogate for the first user when the first user is deciding what bike to buy, but not when the first user is looking for a babysitter. Many other examples are possible.

II. Exemplary Methods

FIG. 1 is a simplified flow chart illustrating a method according to an exemplary embodiment. In an exemplary implementation, method 100 may be carried out by a computing system, and in particular, by a cloud-computing system. However, it should be understood, that other computing system or combinations of computing systems may carry out an exemplary method, without departing from the scope of the invention.

As shown by block 102, method 100 involves the computing system determining a context associated with a first user-profile. The computing system then determines a context-specific user-network for the first user-profile in the determined context, as shown by block 104. As further shown by block 104, the context-specific user-network may include one or more user-profiles that are surrogates for the first user-profile in the determined context. Further, the computing system uses historical context-to-action data for one or more of the surrogate user-profiles as a basis for determining a context-based action that is appropriate in the determined context, as shown by block 106. The computing system then causes a computing device associated with the first user-profile to initiate the context-based action, as shown by block 108.

In an exemplary embodiment, a "user-profile" may be a data structure that includes or provides access to information related to a particular user. Further, the user-profile may be associated with a user account that is created by the user, such a user's account on a social network. When the user registers for their account, the user may optionally provide information to be included in their user-profile. For example, a user-profile may include personal information (name, hometown, job information, education, hobbies, interests, etc.) and/or demographic information (age, sex, ethnicity, race, etc.). The user may therefore control what information is included and/or accessible via their user-profile by accessing their account and setting preferences for their user-profile and/or providing information to include and/or associate with their user-profile.

In a further aspect, user-profile may also provide access to additional information from other sources, such as other accounts that include or provide access to a user's information. In some embodiments, a user's other accounts may be linked to the user's social network account. For example, a user could optionally link their account on the social network to an e-mail account. As such, data such as a user's contacts may be associated with the user-profile on the social network. Further, e-mail correspondence may be analyzed in order to derive information therefrom.

As another example, a user may optionally link an online calendar to their social-network account. Accordingly, scheduling information and/or contact information (e.g., who else is scheduled for activities with a user) may be accessed via the user-profile on the social network.

Further, if a user has an account or accounts on other social networks as well, the user may optionally link their account on one social network to accounts on other social networks. As such, the user may allow for their user-profile from one social network to access additional information from their accounts on other social networks.

Yet further, a user may optionally link their social-network account to accounts with various financial institutions. For example, a user may elect to link their social-network account to a bank account, a credit-card account, an investment account, and/or other such financial accounts. If the user so elects, then the user-profile may provide access to financial information that is available via such financial accounts.

In an exemplary embodiment, a "context-specific user-network" may include one or more user-profiles that, in a particular context, are surrogates for a given user-profile (referred to as "surrogate user-profiles" or "surrogates" herein). A surrogate user-profile is a user-profile that has some level of similarity to the given user-profile in the particular context. As such, information accessible via the surrogate user-profile may be informative with respect to the given user-profile in the particular context. For example, if a given user is in the process of deciding what type of bicycle to buy, surrogates may include user-profiles of users who have purchased a bike recently, who are interested in cycling, who live near the given user, who have a similar income level, who have spent similar amounts on cycling in the past, who have other similarities in the context of buying a bicycle, and/or who have other similarities to the user in the given context. Many other examples are also possible.

In a further aspect, a given surrogate user-profile for the first user-profile may or may not be pre-associated with the first user-profile. For example, a surrogate user-profile may be pre-associated when the surrogate user-profile is linked to the first user-profile as a "friend" on a social network. As another example, a surrogate user-profile may be pre-associated when e-mails have been sent between an e-mail account associated with the first user-profile and an e-mail account associated with the surrogate user-profile. However, it is entirely possible that some or all of the surrogate user-profiles are not pre-associated with the first user-profile, before they are selected as surrogates.

In another aspect, since the surrogates for a user in one context may be dissimilar to the given user in another context (or not similar enough to qualify as a surrogate), the user's context-specific user-network may vary from one context to another. For example, a surrogate for a given user in the context of buying a bicycle may have no similarity or may not be similar enough to the user in the context of looking for local restaurant recommendations. Accordingly, when the given user is looking for local restaurant recommendations, the user's context-specific user-network may differ from when the user is searching for a bicycle to purchase. Many other examples are also possible.

In some embodiments, the first user-profile of method 100 may take the form of a user-profile that is part of a user's account in an online social network. As such, functionality of an exemplary embodiment may be integrated with the user's social network account. Alternatively, a separate and distinct service may be provided via which a user can create a user account for purposes of creating their user-profile. In such an embodiment, this separate account may serve to aggregate the user's information from a number of sources, such as those described above.

III. Exemplary Systems

Figure 2:
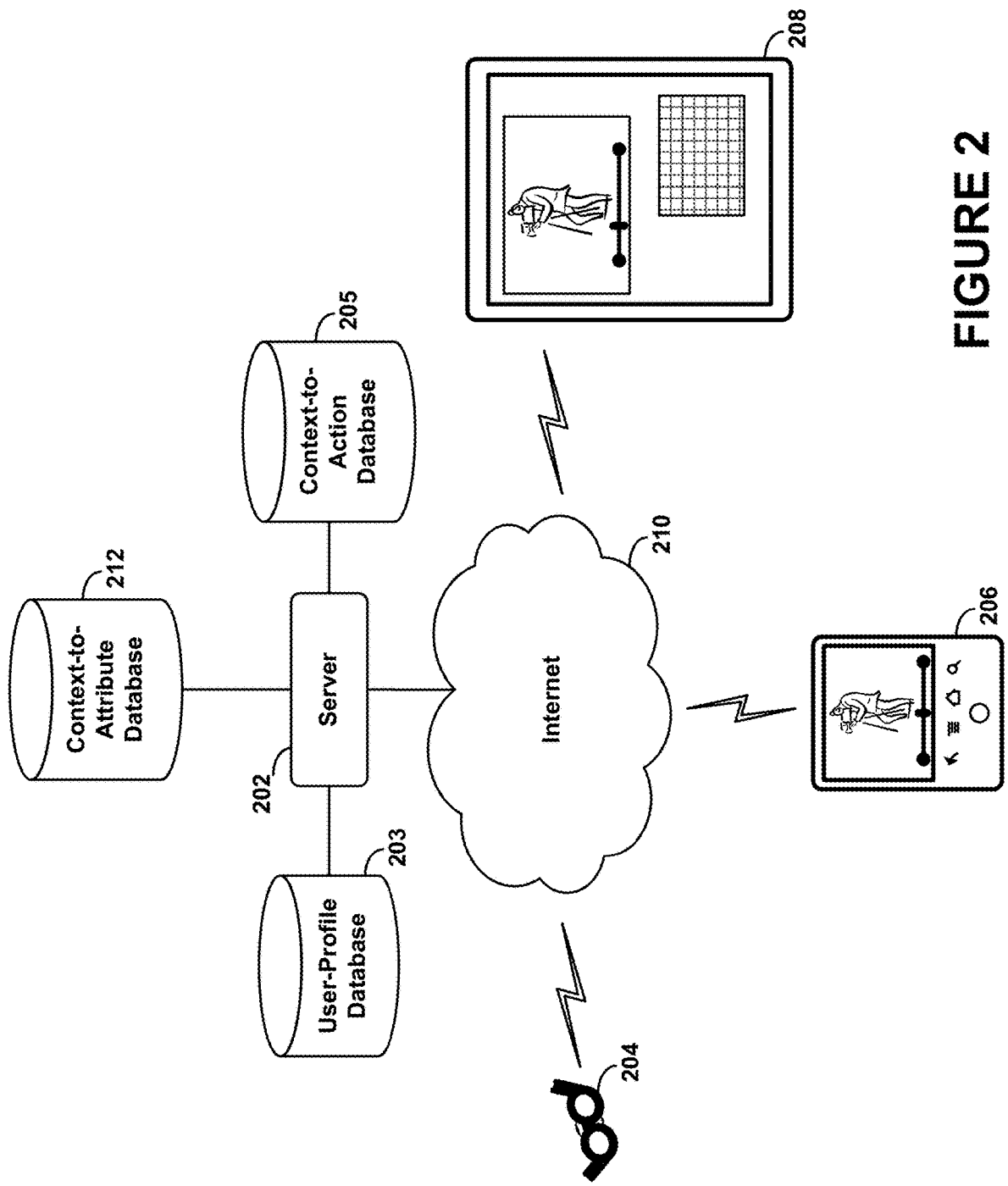
FIG. 2 is a block diagram illustrating a communication network in which an exemplary embodiment may be implemented.

FIG. 2 is a block diagram illustrating a communication network in which an exemplary embodiment may be implemented. As shown, communication network 200 includes a server 202 and a number of computing devices, which include wearable computer 204, mobile phone 206, and tablet computer 208.

In an exemplary embodiment, the server 202 may be implemented in a computing system including one or more computing devices. In particular, server 202 may be a cloud-based server system which is configured to analyze context data associated with a user-profile and determine context-specific user-networks for the user-profile in various contexts. However, it should be understood that server 202 may take on other forms (e.g., other types and/or combinations of hardware, software, and/or firmware), without departing from the scope of the invention.

In order to determine a context-specific user-network for a given user-profile, server 202 may include or have access to a user-profile database 203. The user-profile database 203 may include data for a number of user-profiles, which are associated with a number of different users. Each user-profile in user-profile database 203 may include various types of data related to the associated user and/or may provide access to other sources of data related to the associated user. A user-profile in user-profile database 203 may include other types of data as well. As such, server 202 may be configured to access user-profiles in user-profile database 203 in order to select surrogates for a given user-profile in a given context.

Furthermore, in order to access historical context-to-action data for selected surrogates, server 202 may include or have access to a context-to-action database 205. The context-to-action database 205 my include data that maps actions to certain contexts (or possibly to certain context signals or combinations of context signals) on a user-by-user basis. As such, the server 202 may use data from context-to-action database 205 to determine past actions that are associated with a surrogate user-profile, and which context or contexts are associated with the each of the surrogate's past actions.

Context-to-action database 205 may be populated by data provided from various sources. In some embodiments, users may optionally allow their mobile phones, laptop computers, desktop computers, and other such computing devices to provide data for context-to-action database 205. For example, such computing devices may report context data and data regarding actions that a user has initiated on the device, which may be used to populate context-to-action database 205. Further, when server 202 initiates on action on behalf of a user, this action and context information related to the user may be stored in the context-to-action database 205 in association with the user-profile for the user.

In an exemplary embodiment, a user may access their account on the social network via a computing device such as wearable computer 204, mobile phone 206, or tablet computer 208 (collectively referred to as devices 204 to 208). For example, the user may access a social networking website via a web browser on such a device, and then logging in to their account via a social networking website. As another example, the user may access their account via a dedicated social-networking application (e.g., an "app) on their computing device.

In a further aspect, wearable computer 204, mobile phone 206, and tablet computer 208 may be configured to communicate with server 202 via a network such as the Internet 210. Configured as such, wearable computer 204, mobile phone 206, and/or tablet computer 208 provide context data to the server 202. Correspondingly, server 202 may be configured to receive context data from various computing devices such as wearable computer 204, mobile phone 206, and tablet computer 208.

In some embodiments, a device 204 to 208 may send server 202 context signals that are associated with the device (and thus may be indicative of the context for the user of the device). In such an embodiment, server 202 may then be configured to use the context signals to determine a context. Further, the server 202 may determine which user-profile is associated with the device, and may infer that the determined context should be associated with the user-profile.

Additionally or alternatively, a device 204 and 208 may be configured to determine its own context (and to associate its context with a user-profile that is associated with the device). For example, mobile phone 204 may determine and/or acquire one or more context signals and use these context signals to determine the context. In such an embodiment, the device 204 to 208 may send the determined context to server 202, which may then select surrogates for a context-specific user-network for a user-profile in the determined context. In an alternative implementation, a device 204 to 208 may be configured to determine the context-specific user-network, without necessarily involving server 202.

In a further aspect, a user may associate a number of their devices with their user-profile. For example, if some or all of devices 204 to 208 are owned by or registered to the same user, these devices may all be associated with the user's user-profile in user-profile database 203. As such, when server 202 receives context data from a registered device 204 to 208, server 202 may responsively associate the context data with the user-profile with which the device 204 to 208 is associated.

In an exemplary embodiment, computing devices such as server 202 and/or devices 204 to 208 may include program instructions stored in data storage that are executable to provide the functionality described herein. Such computing devices may further include the one or more processors that can be configured to execute the program instructions that stored in the data storage and/or other instructions. The one or more processors may be one or more general purpose processors and/or one or more special purpose processors (e.g., digital signal processors, application specific integrated circuits, etc.), or may take another form.

In an exemplary embodiment, data storage in computing devices such as server 202 and/or devices 204 to 208, as well as in data storage facilities such as databases 203, 205, 212, may take various forms. The data storage can include one or more non-transitory computer-readable storage media that can be read or accessed by at least one of the processors. The one or more computer-readable storage media can include volatile and/or non-volatile storage components, such as optical, solid-state, magnetic, organic or other memory or disc storage, which can be integrated in whole or in part with at least one of the one or more processors. In some embodiments, the data storage can be implemented using a single physical device (e.g., one optical, magnetic, organic or other memory or disc storage unit), while in other embodiments, the data storage can be implemented using two or more physical devices. Herein, data storage may also data storage that stores data for short periods of time like register memory, processor cache, and random access memory (RAM), and/or data storage that stores program code and/or data for longer periods of time, such as secondary or persistent long term storage (e.g., read only memory (ROM), optical or magnetic disks, compact-disc read only memory (CD-ROM), etc.).

It should be understood that FIG. 2 is presented merely for purposes of example, and that communication network 200 may comprise more or fewer components in different arrangements than shown. Further, each of the illustrated computing systems, such as server 202, wearable computing device 204, mobile phone 206, and/or tablet computer 208, may include multiple physical and/or logical components arranged to operate in conjunction with one another. In general, changes may be made to the systems and devices shown in FIG. 1, as well as to the particular arrangement illustrated by FIG. 1, without departing from the scope of the invention.

IV. Determining Context

As noted above, an exemplary method 100 may involve determining a context that is associated with a user-profile. In general, a "context" may be determined based on various "context signals" or combinations of context signals. A context signal may be any signal that provides a measurement or otherwise provides information pertaining to the state or the environment associated with a certain subject (e.g., with a certain user, device, event, etc.).

In some instances, a context may be a state associated with a particular context signals or set of context signals. However, a context may also be abstracted from the context signals upon which it is based. As such, a "context" may also be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For example, context signals indicating that that it is 6:30 AM on a weekday and that a user is located at their home may be used to determine the context that the user is "getting ready for work."

Many types of information, from many different sources, may be used as context signals or provide information from which context signals may be derived. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information, (bb) a current location, (cc) a past location, and (dd) a future location, among others. Those skilled in the art will understand that the above list of possible context signals and sources of context information is not intended to be limiting, and that other context signals and/or sources of context information are possible in addition, or in the alternative, to those listed above.

In some embodiments, the detection or observation of a certain event in data from a certain data source may itself be interpreted as a context signal. For example, the fact that a certain word is detected in an audio signal from a microphone may be interpreted as a context signal providing context to the event of that word being spoken. Other examples are also possible.

In some embodiments, context signals may be obtained or derived from sources such as a user's computer-based calendar, blog, webpage, social network account, and/or e-mail account, among others. For instance, context signals may be provided by user's calendar entries, e-mail messages, and social-network profile, messages, posts, and/or tweets. Further, in some embodiments, similar context signals may be obtained or derived from other users' computer-based calendars, blogs, webpages, social network accounts, and/or e-mail accounts, who are listed in a user's electronic contact list, listed as a "friend" in a user's social network, or otherwise associated with the user (provided such users have opted in to share such context information).

It should be understood that the above examples of contexts are provided for illustrative purposes, and are not intended to be limiting. Other examples are also possible.

In a further aspect, to determine a context associated with a given user-profile, a cloud-based server may be configured to use context data from a single device that is associated with the user-profile. Alternatively, the server may be configured to aggregate context data from two or more devices that are associated with the user-profile, and us the aggregate context data to determine context for the user-profile. For instance, referring back to FIG. 2, server 202 may use context data from a single device, such a mobile phone 206, to determine context for the user-profile that is associated with that device. However, if wearable computer 204, mobile phone 206, and tablet computer 208 are all associated with the same user-profile, then server 202 could also use aggregate context data from some or all of devices 204 to 208 to determine context for the user-profile.

V. Determining a Context-Specific User-Network

Figure 3:
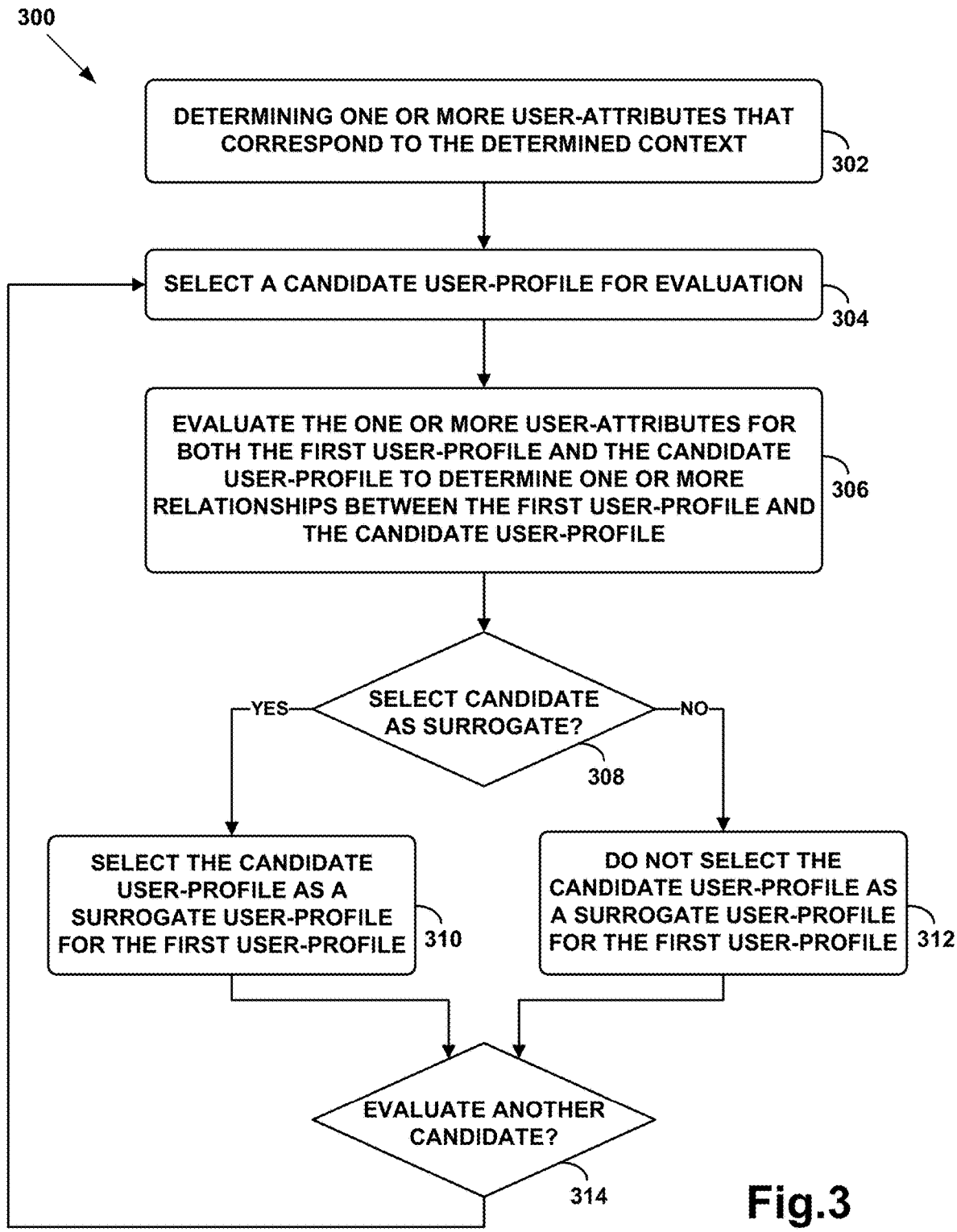
FIG. 3 is a simplified flow chart illustrating a method for determining a context-specific user-network, according to an exemplary embodiment.

As described in reference to method 100, once a context for a user-profile has been determined, an exemplary embodiment may determine a context-specific user-network. FIG. 3 is a simplified flow chart illustrating a method for determining a context-specific user-network, according to an exemplary embodiment.

More specifically, as shown by block 302, method 300 involves the computing system determining one or more user-attributes that correspond to the determined context. These user attributes may provide a framework that is used to evaluate other user-profiles to determine which user-profiles should be selected as surrogates for the first profile in the determined context. Each of the evaluated user-profiles may be referred to as a "candidate" user-profile.

In particular, the computing system may select a candidate user-profile for evaluation, as shown by block 304. The computing system may then evaluate the one or more user-attributes for both the first user-profile and the candidate user-profile in order to determine one or more relationships between the first user-profile and a candidate user, as shown by block 306. Then based at least in part on the one or more relationships between the first user-profile and the candidate user-profile, the computing system may determine whether or not the candidate user-profile should be selected as one of the surrogate user-profiles, as shown by block 308. If it is determined that the candidate user-profile should be selected, then the computing system selects the candidate user-profile as one of the surrogate user-profiles for the first user-profile in the determined context, as shown by block 310. Otherwise, the candidate user-profile may not be selected as a surrogate user-profile, as shown by block 312.

Further, the computing system may repeat blocks 304-312 for a number of candidate user-profiles. In particular, the computing system may determine whether to evaluate another candidate user-profile, as shown by block 314, and repeat blocks 304-312 as needed, so long as it is determined that more candidates should be evaluated.

As one example, consider the context of a first user planning their next vacation. In this context, method 300 may be implemented to determine user-attributes such as the type of hotels a user has booked in the past (boutique, large resort, bed and breakfast, etc.), the price range of hotels the user has booked in the past, the destinations of the user's past vacations, the types of vacations the first user has taken in the past (e.g., cruises, camping trips, backpacking trips, organized tours, diving trips, skiing trips, etc.), the cost of the vacations the first user has taken in the past, the forms of transportation used for travel in the past (e.g., plane flights, car trips, train rides, etc.), and/or the intended destination of the next vacation, among other possible attributes. Further, this implementation of method 300 may involve selecting surrogates who have booked the same or similar types of hotels in the past, who have booked hotels in the same or similar price range in the past, who have taken the same or similar types of vacations in the past, who have spent the same or similar amounts of money on their vacations in the past, who have used the same forms of transportation for travel in the past, who have been to the same or similar vacation destinations in the past, and/or who have been to the first user's next vacation destination in the past, among other possible attributes. Many other implementations are also possible.

A. User-Attributes Corresponding to a Given Context

At block 302, various types of attributes may correspond to the determined context. In general, the corresponding attributes are such that when users are similar to one another with respect to the corresponding attributes, one user's historical information may be informative for taking on action on behalf of the other such user in the given context.

For instance, in some embodiments, the attributes that are used to select surrogates for a given context may include a user's demographic information, such as the user's age, home address, sex, sexual preference, ethnicity, race, national origin, citizenship, family size, household size, number of relatives who live with the user, relationship to family members who live with the user (e.g., whether a user's children, parents, or other relatives live with the user), whether user lives with a non-family member (e.g., a roommate), sex of family members who live with the user, marital status, and/or other demographic attributes.

In some embodiments, the attributes that are used to select surrogates in a given context may include attributes of a user's work such as current position or job title, past positions or job titles, amount of experience in a position, whether or not the user is self-employed, employer information, the user's field of work, work location or locations, amount of travel for work, destination(s) of travel for work, duration of commute to work, route of commute to work, and/or other work related attributes.

Further, in some embodiments, the attributes that are used to select surrogates in a given context may include attributes of a user's activities, interests, and/or hobbies. Examples of such attributes may include: type or types of activities, interests, and/or hobbies, location or locations related to activities, interests, and/or hobbies, level of involvement in activities, interests, and/or hobbies (e.g., amount of time spent on, regularity of participation in, and/or spending level related to activity, interest, or hobby), among others.

Yet further, in some embodiments, the attributes that are used to select surrogates in a given context may include attributes of a user's consumer habits and/or purchasing history. Examples of such attributes may include: historical purchases of goods and/or services, categories or types of goods and/or services purchased in the past, price of goods and/or services purchased in the past, total spending for a certain type of good or service, and/or historical transaction types (e.g., purchase at brick and mortar store, purchase via telephone, online purchase, etc.), general spending habits, and/or income level, among others.

Even further, in some embodiments, the attributes that are used to select surrogates in a given context may relate to a user's daily habits. Examples of such attributes may include attributes of a user's commute or other regular travel such as the starting location and/or the destination of the travel, the route of travel, the duration of travel, and/or the mode of transportation (e.g., by car, by bus, by train, by boat, by foot, etc.), among others. Other examples of such attributes may include attributes of exercise habits (e.g., going to gym at a certain time of day), attributes of dining habits (e.g., eating dinner with family at a certain time, taking a bag lunch to work, etc.), and various other regular habits (e.g., reading the newspaper in the morning, frequency of checking e-mail, etc.).

B. Selecting Surrogate User-Profiles in a Given Context

As noted, block 306 of method 300 may involve determining a relationship between the first user-profile and each of one or more candidate user-profiles. Then, at block 308, candidate user-profiles with the strongest relationship in the given context (e.g., the most similar candidates) may be selected as surrogates for the first user-profile in the given context.

In some applications of an exemplary method, the selection of a candidate user-profile as a surrogate may involve an evaluation of the relationship between an individual attribute of the first profile and a corresponding attribute of the candidate user-profile. For example, an exemplary method may involve determining a home location indicated with the first user-profile and a home location indicated by the candidate user-profile. Various relationships between the given attribute of the first profile and the corresponding attribute of a candidate user-profile can then be evaluated to help determine whether the candidate should be selected as a surrogate. For example, when home location is the user-attribute being evaluating, an exemplary system might determine whether the first user-profile and the candidate user-profile: (a) live within a certain distance of each other, (b) live in the same city, (c) live in the same region, (d) live in the same state, (e) live in the same country, or (f) live in the same type of location (e.g., urban, suburban, rural). Other examples are also possible.

The specific relationship or relationships that are evaluated when considering whether or not to select the candidate user-profile as a surrogate may vary depending upon the context. For example, in the context of a first user searching for a restaurant within walking distance from their house, a good surrogate may be someone who lives within walking distance from the first user. However, in the context of the first user is searching for a restaurant with no preference as to driving or walking to the restaurant, someone who lives in the same city, but beyond walking distance from the first user, may also be a good surrogate for the user.

As another example, in the context of a first user searching for a bicycle to purchase for use in an urban setting, data from a candidate in a distant urban location may be just as informative as data from a candidate who lives in the same urban setting as the first user. Thus, rather than evaluate the home location attribute for proximity (e.g., walking distance or within the same city), an exemplary system may evaluate whether a candidate is lives in an urban area, without any regard for the proximity of the candidate to the first user. Many other examples and variations are possible.

Accordingly, a further aspect of an exemplary method may involve using the determined context as a basis for determining the user-attributes that are evaluated in the surrogate-selection process, as illustrated by block 302 of method 300. Further, in such an embodiment, the context may define not only which attributes are considered when selecting surrogates, but the manner in which those attributes are used to select surrogates (e.g., by determining which relationships between attributes should be considered in the surrogate-selection process). As such, an exemplary method may further involve selecting one or more relationships to be determined from the evaluation of the one or more user-attributes.

The following description provides examples of some of the many possible relationships between corresponding attributes of the first user-profile and a candidate user-profile, which may be evaluated in a surrogate-selection process such as method 300. The below examples are provided for illustrative purposes and are not intended to limit the scope of the invention.

In some embodiments, the surrogate-selection process may incorporate relationships between the demographic information indicated by the first user-profile and corresponding demographic information indicated by a candidate user-profile. For instance, embodiment, an exemplary system may evaluate relationships between demographic attributes indicated by a first-user profile of a first user and a candidate profile of a second user such as: (a) whether the first user and second user are the same age, within the same age group, and/or whether the age difference between the first and second user is less than a threshold difference, (c) whether the proximity of the first and second users' home addresses meets certain criteria, (d) whether the first and second user are the same sex, sexual preference, ethnicity, race, national origin, and/or citizenship, (d) whether the first and second user have the same or a similar family size, household size, number of relatives who live with the user, (e) whether the first and second user both have children, parents, and/or other relatives that live with the respective user, (f) whether the first and second user both live with a non-family member (e.g., a roommate), (g) whether the first and second user have the same marital status, and/or (h) whether other relationships between demographic attributes of the first and second user exist.

Further, in some embodiments, the surrogate-selection process may incorporate relationships between work attributes of the first user-profile and a candidate user-profile. For instance, an exemplary system may evaluate relationships between demographic attributes indicated by a first-user profile of a first user and a candidate profile of a second user such as: (a) whether the first and second user have the same or a similar position or job title, (b) whether the first and second user have had the same or similar positions or job titles in the past, (c) whether the first and second user have the same or a similar amount of experience in their respective positions, (d) whether the first and second user work in the same field, (e) whether the first and second user work for a similarly-sized company, (f) whether the first and second user or both self-employed or both are an employee of a company, (g) whether the proximity of the first and second users' work addresses meets certain criteria, (h) whether the first and second user both travel for work, (i) whether the first and second user travel to similar destination(s) for their respective work, (j) whether the first and second user have commute a similar distance to work, (k) whether the first and second user have the same route or similar routes for their respective commutes to work, (l) whether the first and second user utilize the same form of transportation to commute to work (e.g., whether both drive a car or whether both take a bus), (m) whether both the first and second user utilize public transportation (e.g., a bus, train, or ferry), or alternatively, whether both utilize private transportation to commute to work, and/or (n) whether other relationships between work attributes of the first and second user exist.

Yet further, in some embodiments, the surrogate-selection process may incorporate relationships between corresponding attributes of activities, hobbies, and interests indicated by the first user-profile and a candidate user-profile. For instance, an exemplary system may evaluate relationships such as: (a) whether the first and second user have common activities, interests, and/or hobbies, (b) whether the first and second user engage in common activities in the same location, (c) whether the proximity of locations where the first and second user participate in a common activity meets certain criteria, (d) whether the first and second user engage in a common activity in the similar type of location, without necessarily considering proximity of the locations whether the first and second user engage in the common activity (e.g., whether both go running on a treadmill at a gym, or whether both go running outdoors), (e) whether the first and second user dedicate the same or a similar amount of time to a common activity, interest, or hobby, (f) whether the first and second user have the same or a similar skill level with respect to a common activity, interest, or hobby, (g) whether the first and second user are involved in a common activity, interest, or hobby at the same or similar times, or have a similar schedule with respect to a common activity, interest, or hobby, (h) whether the first and second user spend the same or a similar amount for a common activity, interest, or hobby, and/or (i) whether other relationships between activities, interests, and/or hobbies of the first and second user exist.

In another aspect of some embodiments, the surrogate-selection process may incorporate relationships between consumer habits and/or purchasing history of the first user-profile and a candidate user-profile. For instance, an exemplary system may evaluate relationships such as: (a) whether the first and second user have purchased the same or similar goods and/or services in the past, (b) whether the first and second user have purchased the same or similar categories or types of goods and/or services in the past, (c) whether the first and second user have spent the same or a similar amount on the same goods and/or services, (d) whether the first and second user have spent the same or a similar amount on the same category or type of goods and/or services in the past, (e) whether the first and second user have the same or similar total spending level for a certain type of good or service, (f) whether the first and second user have utilized the same or similar transaction types in the past (e.g., whether both tend to shop at brick and mortar stores, whether both tend to purchase via telephone, or whether both tend to purchase goods online), (g) whether the first and second user have the same or similar income level, and/or (i) whether other relationships exist between consumer habits and/or purchasing histories of the first and second user.

In a further aspect, an exemplary system, such as server 202 of FIG. 2, may be configured to select user-attributes and/or the relationships between these attributes that will be used in the surrogate-selection process in a given context. To facilitate this functionality, server 202 may include or have access to a context-to-attribute database 212. The context-to-attribute database 212 may include data that maps a given context to a certain attribute or attributes that should be considered when selecting surrogates in the given context. In an exemplary embodiment context-to-attribute database 212 may include such mapping data for a number of contexts. In a further aspect, context-to-attribute database 212 may include data for a given context that indicates not only which attributes should be considered, but the specific relationship or relationships that should be evaluated with respect to the indicated attributes.

In yet a further aspect, rather than immediately determine an action to take, an exemplary system may determine that additional information might help to determine a more appropriate action. In this case, the system may send a message to the user requesting additional information (e.g., additional context information). For instance, the system may send an e-mail or text message, or initiate a push notification on the user's mobile phone, requesting additional context information. As a specific example, in the context of a user going to the gym, a push notification could be used to ask the user if they want to walk or drive to gym. This additional information may help select surrogates that are more appropriate for the user in this context, which in turn may lead to selection of an action that is more desirable to the user.

Further, in some embodiments, a user's wearable device may provide a user-interface for viewing a context-specific user-network and/or characteristics thereof. For example, a user-interface may display a list of the surrogate user-profiles and possibly some of the information from each surrogate user-profile (e.g., the information that led the user-profile to be selected as a surrogate). As another example, the user-interface might display a summary of the attributes that were used to select the surrogates in the context-specific user-network.

In a further aspect of such an embodiment, the user-interface may allow a user to edit and/or provide feedback on the context-specific user-network. For instance, the user-interface may allow the user to approve or disapprove of certain user-profiles being used as surrogates. The user-interface may also allow the user to add surrogates to the context-specific user-network (e.g. by indicating to add user-profiles that were not initially selected as surrogates), and/or allow the user to remove surrogates from the context-specific user-network. Additionally or alternatively, the user-interface may allow the user to approve or disapprove of attributes that were used to build the context-specific user-network. Furthermore, the user-interface may allow the user to add attributes for consideration and/or to remove attributes that were considered. Even further, when the user adds or removes attributes, an exemplary device may responsively re-determine the context-specific user-network based on the newly-defined set of attributes.

When a user edits and/or provides feedback on a context-specific user-network, an exemplary server system may be configured to utilize this information in a machine-learning process in order to improve future determinations of context-specific networks for the user. To do so, the server system may apply any well-known machine-learning process or processes, such as an artificial neural network (ANN), SVM (Support Vector Machines), Genetic Algorithms, Bayes Nets, a Reinforcement Learning method, or a Decision Tree, for instance.

VI. Using Context-to-Action Data to Determine a Context-Based Action

Once a context-specific user-network is determined, historical context-to-action data for the surrogate user-profiles may be used to determine a context-based action, as shown by block 108 of FIG. 1. The context-to-action data may take various forms, and may provide different types of information, depending upon the implementation. The manner in which the context-to-action data is used to select a context-based action to take may also vary, depending upon the implementation.

In an exemplary embodiment, a server may initially use historical context-to-action data to select one or more candidate actions, which, in the past, have been initiated in association with at least one of the surrogate user-profiles in the determined context. The server may then select at least one of these candidate actions as the context-based action that is appropriate in the determined context in the given context.

In some embodiments, the context-based actions may be selected from candidate actions by ranking the candidate actions, and then selecting a highest-ranking candidate action as the context-based action that is appropriate in the determined context in the determined context. Various techniques may be used to rank the candidate actions. For example, the server may use historical context-to-action data for one or more of the surrogate user-profiles to determine a probability that the candidate action is correct for the first user-profile in the determined context, and then rank the candidate actions according to their respective probability of being correct for the first user-profile in the determined context.

In another aspect, the rating for a given candidate action may be based on feedback data indicating correctness of the past instances of the candidate action in the determined context. In such an embodiment, a server or another computing system may carry out an ongoing machine-learning process in order to populate and/or update a context-to-action data based on explicit and/or implicit feedback related to actions that are initiated on a user's behalf. For example, when an exemplary system takes a context-based action on a user's behalf, the system may subsequently receive explicit feedback from the user that the action was or was not desired. Alternatively, the system may subsequently detect indirect feedback that relates to the appropriateness of the action, which is implicitly or indirectly provided by the user. For instance, feedback may be inferred from a subsequent user-action that counteracts or cancels the previously-initiated action, or a subsequent user-action that relies or builds upon the previously-initiated action. For example, if context from a user causes a smart-home to pre-fill a warm bath for the user for when they arrive home and the user drains the bath without getting into it, that could be interpreted as an implicit negative reinforcement for having initiated that action for that user given that context. Other examples are also possible.

In such an embodiment, the rating for a given candidate may be based on feedback for the action that is associated with one or more surrogate user-profiles. For instance, if feedback from surrogates indicates that the surrogates typically approve of an action, the action may be rated more highly. However, if feedback from surrogates indicates that the surrogates typically dislike the action (or possibly that the surrogates are indifferent to the action), then the action may be given a lower rating.

In a further aspect of some embodiments, the context-to-action data may also indicate conditional probabilities that a given action is correct when a certain context, a certain context signal, or a certain combination of context signals is detected. In such an embodiment, using conditional probabilities may help to account for the fact that various context signals may be correlated with one another. In particular, because context signals may not be independent, an exemplary context-to-action data may build a conditional-probability matrix for a number of context signals that are correlated with one another, which indicates, for each pairing of context signals, the probability a given action is correct when a given context signal is detected, given that another context signal is also detected. Details of such statistical-analysis techniques, which may be applied when the probability of an event depends on a number of variables that are also dependent on one another, are well known in the art, and thus are not discussed further herein.

In some embodiments, an exemplary system may pre-select a candidate action to evaluate in the historical context-to-action data, and then take the action if, for example, its probability of being correct is above a threshold level. The computing system may also use the context-to-action data to analyze the correctness of a number of different candidate actions. In this case, the computing system may select the candidate action with the greatest probability of being correct, given the determined context, or possibly determine that no actions are likely enough to be correct to justify being initiated. For example, the computing system may select the action having the highest probability of being correct, so long as its probability of being correct is above a threshold level. Further, in the event that the action most likely to be correct is not above the threshold, the computing system may determine that no action should be initiated. Alternately, "no action" can be considered one of the actions and then no threshold need be applied.

In a further aspect, some embodiments may weigh historical context-to-action data from all surrogates equally when determining which context-based action should be taken. However, it is also possible that context-to-action data for a given surrogate may be weighted based on various factors. For instance, in an exemplary method, context-to-action data for a given surrogate may be weighted according to how similar the given surrogate is to the first user-profile. As an example, context-to-action data for surrogates that have attributes that are more similar, and thus are more strongly related to the first user-profile in the given context, may be given greater weight. Other factors may also be considered. As one additional example, surrogate user-profiles that were pre-associated with the first user-profile may be given greater weight.

In a further aspect, context-to-action data that is more recent may be given greater weight. For instance, consider a hypothetical scenario where two surrogates are considered to be equally similar to a certain user in a given context. In this scenario, context-to-action data for a first one of these users may still be given greater weight, if the context-to-action data for the first user has been updated more recently than the context-to-action data for the second user. Context-to-action data may have been updated for various reasons, such as whenever an action is taken in association with a certain user. Thus, in practice, when an action has been taken more recently for a first surrogate, who is otherwise identical to a second user, the context-to-action data for the first user may be weighted more heavily.

VII. Exemplary Context-Based Actions

In a further aspect, various types of context-based actions may be initiated, depending upon the particular implementation. In some embodiments, a context-based action may simply involve providing content to a computing device associated with the first user-profile, so that the content may be displayed or otherwise presented to the user. Other, more complex context-based actions are also possible. The following description sets forth examples of the numerous types of actions that may be initiated. The following examples are provided for illustrative purposes, and are not intended to be limiting.

In some applications, an exemplary method may be used by various computing devices to initiate home-automation actions. For example, an exemplary action may involve control and/or communication with (a) a home appliance, (b) a refrigerator, (c) a microwave, (d) a dishwasher, (e) a freezer, (f) a washer, (g) a dryer, (h) a combination washer and dryer, (i) a television, (j) a home stereo unit, (k) a laptop computer, (l) a desktop computer, (m) a tablet computer, (n) a smartphone, (o) a garage door opener, (p) a home security system, (q) a home-automation control system, (r) a heating appliance, (s) a cooling appliance, and/or (t) a cooking appliance, among others.

As one example of a home-automation application, an exemplary device may determine that the current context is the user travelling to their home after an activity involving exercise. For instance, a user's smartphone may use various context signals to determine this context, such as a series of location measurements, accelerometer measurements, compass readings, the time of day (e.g., when a user normally comes home after an evening workout), and so on. In addition, a calendar entry, which indicates that the user had a session scheduled with a personal trainer just prior to driving home, may provide an additional context signal indicating where the user is driving home from. The smartphone may actively determine the context from such context signals, or may relay some or all of the context signals to a server in the cloud, which may then determine that the user travelling to their home after an activity involving exercise.

The cloud server may then determine the user-profile that is associated with the smartphone, and a context-specific user-network of other user-profiles that are surrogates for the user-profile in the context of the user travelling to their home after an activity involving exercise. For example, the cloud server may select surrogates that live within a certain distance from the user (e.g., as indicated by the distance between home locations indicated by the user-profiles), that have similar exercise habits, and/or that travel a similar route between where they exercise and their home. Other attributes may additionally or alternatively be considered in the surrogate-selection process.

Once the context-specific user-network has been determined, the cloud server may access historical context-to-action data for the surrogates to determine which actions have been associated with travelling home after an activity involving exercise. For instance, if the context-to-action data indicates that a number of surrogates (e.g., a threshold number or percentage) have taken a certain action shortly after returning home from exercising, the cloud server may conclude that it should initiate or prepare for the action. As a specific example, if a threshold percentage of surrogates have drawn a bath shortly after arriving home after an activity involving exercise, the cloud server may communicate with a network connected bathtub, possibly via a home-control center, in order to draw a bath that will be hot when the user arrives home.

It should be understood that the above application of an exemplary method is provided for illustrative purposes and is not intended to be limiting. Many other home-automation applications are possible.

In some applications, an exemplary method may be used to initiate various appointment, calendar, reservation, reminder, and/or schedule-management actions. For instance, an exemplary device may be configured to take context-based actions such as: (a) creating a calendar entry, (b) deleting an existing calendar entry, (c) updating an existing calendar entry, (d) setting a reminder for a calendar entry, (e) creating a meeting entry, (f) deleting an existing meeting entry, (g) updating an existing meeting entry, (h) sending one or more invitations for a meeting entry, (i) withdrawing one or more invitations for a meeting entry, (j) setting a reminder for a meeting entry, (k) creating a task entry, (l) deleting a task entry, (m) updating a task entry, and/or (n) setting a reminder for a task entry, among others.

For example, an exemplary method may be implemented to detect a context in which surrogates for a user have previously set, created, modified, or cancelled an alarm or reminder, and to responsively set, create, cancel, modify an alarm or reminder for the user (or provide a suggestion to set, create, cancel, modify such an alarm or reminder). As a specific example, a user may create a calendar entry for the user's first personal training session at a certain gym on a Wednesday morning. The calendar entry may be mapped to the user's user-profile such that the information is available to a cloud server. The cloud server may then determine surrogates for the user in the context of preparing for a Wednesday morning personal-training session at the given gym. For instance, the surrogates for the user may include other users who go to the gym during the morning, who go to the gym on a weekday, who live near the user, who have similar morning habits (e.g., take the same amount of time to eat breakfast, shower, brush their teeth, get dressed for work, etc.), who drive a similar distance and/or a similar route from their home to the given gym, and/or who have other similar attributes in the context of preparing for a Wednesday morning personal-training session at the given gym.

Once the context-specific user-network has been determined, the cloud server may access historical context-to-action data for the surrogates to determine which actions have been associated with preparing for a Wednesday morning personal-training session at the given gym. For example, the context-to-action data may indicate that, on average, surrogates set their alarms to gets up an hour before such Wednesday morning personal-training session. Accordingly, the cloud server may send a message to a smartphone associated with the user's user-profile, which instructs the smartphone to set an alarm or reminder for an hour before the personal-training session. Alternatively, the cloud server may initiate a suggestion action to suggest such an alarm to the user. For instance, the cloud server may send an e-mail or SMS message to the smartphone associated with the user-profile.

It should be understood that the above application of an exemplary method is provided for illustrative purposes and is not intended to be limiting. Many other appointment, calendar, reservation, reminder, and/or schedule-management applications are possible.

In a further aspect, an exemplary method may be used to initiate various user-interface changes. For example, an exemplary server may be configured to use context-to-action data for surrogates to a first user-profile to determine what user-interfaces have been previously used and/or selected by surrogates in a given context and to responsively coordinate with devices associated with the first user-profiles to provide the same user-interfaces. Examples of such user-interface actions may include: (a) changing the visual appearance of a user-interface, (b) activating or de-activating a certain user-interface system or device (e.g., changing the user-interface device via which a user can provide input to certain application), and/or (c) changing the way interactions with a user-interface are interpreted (e.g., reassigning a mouse button or keyboard shortcut to a different operation), among others.

As one specific example, a wearable computer with a head-mounted display (HMD) may determine, based on two or more context signals, that a user who is driving their car is lost. (Note that a wearable computer with an HMD is described in greater detail with references to FIGS. 12A, 12B, and 13.) For instance, the wearable computer may determine a "lost while driving" context for the driver by analyzing context signals such as: (a) the user's location, (b) the user's direction of travel, (c) a calendar entry indicating the user has an appointment at a certain location (that the user's direction of travel is carrying them away from), (d) a route of travel (e.g., where the user has "gone in circles," or travelled on a "zig-zag" course), (e) measurements from biometric sensors (e.g., a pulse reading indicating that the users pulse has gone up), among others.

When the wearable computer determines the user is "lost while driving," the wearable computer may send an indication of this context to a cloud server (and possibly identify a user-profile associated with the wearable computer at the same time). The cloud server may then determine surrogates for associated user-profile, and based on context-to-action data for the surrogates in this context, determine that in this context, surrogates have typically displayed a map on one of their devices in (e.g., on an HMD, a smartphone, or an in-car navigation system). Further, the cloud server may determine that when surrogates are "lost while driving," the surrogates typically display the map such that it does not obstruct their way of the road (e.g., in the peripheral of the user's field of view in an HMD). Accordingly, the cloud server may send the wearable computer a message that indicates to display a map which shows the user's current location, and possibly directions to an intended location if available or determinable, in the HMD (and possibly in the peripheral of the user's field of view in an HMD). Further, the cloud server may determine that when surrogates are "lost while driving," the surrogates often turn down their car stereo as well. Accordingly, the cloud server may also instruct an in-car computing system associated with the first user-profile to turn down or turn off the stereo (if it is on).

It should be understood that the above application of an exemplary method is provided for illustrative purposes and is not intended to be limiting. Many other user-interface applications are possible.

VIII. Use of Context-Specific User-Network to Provide Information

In some embodiments, a context-specific user-network may be utilized to help provide a user with information, rather than using the context-specific user-network to take an action on the user's behalf (It also possible that an exemplary system may provide information in addition to taking an action on the user's behalf.)

Figure 4:
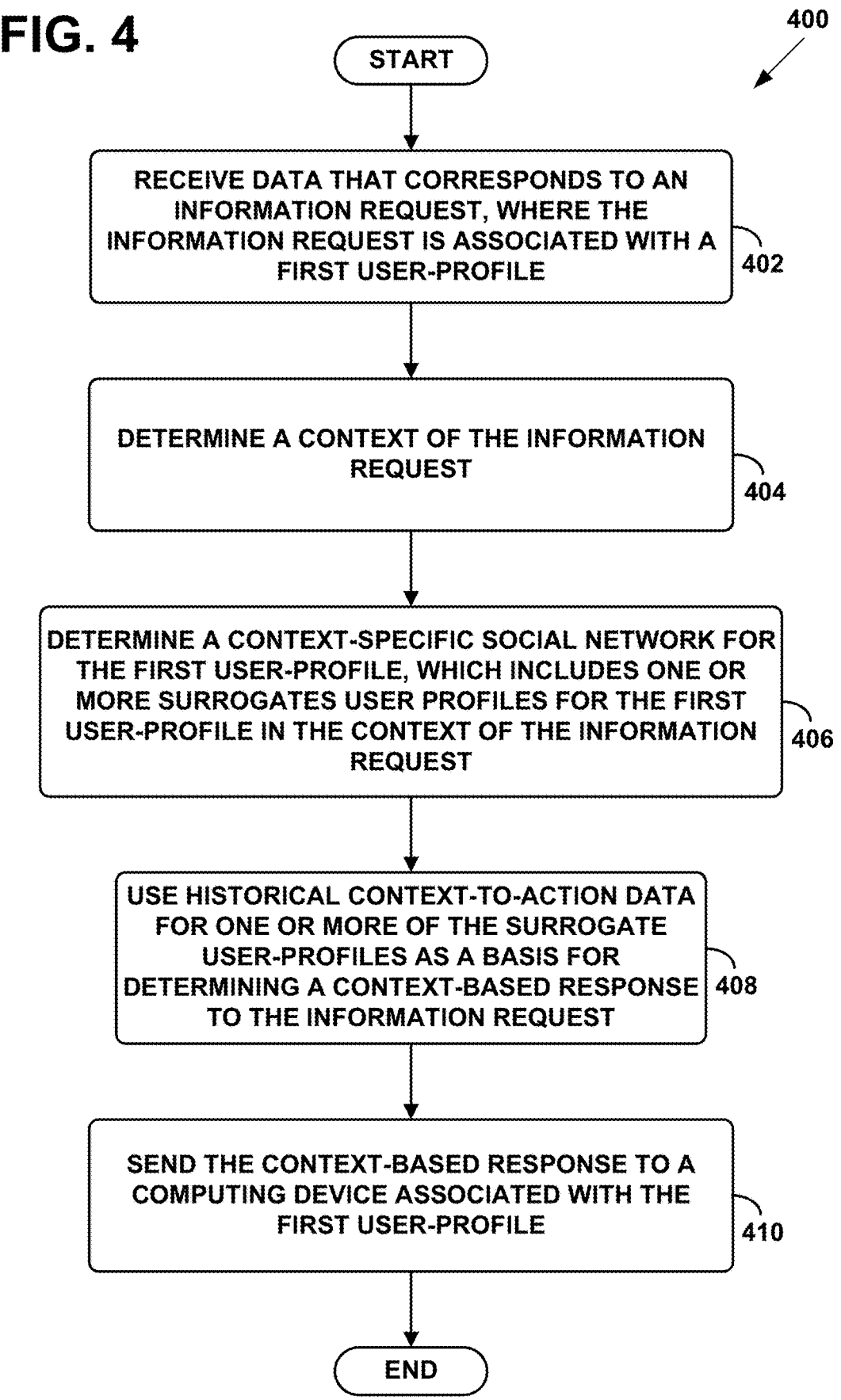
FIG. 4 is another flow chart illustrating a method according to an exemplary embodiment.

FIG. 4 is another flow chart illustrating a method according to an exemplary embodiment. More specifically, method 400 uses context-specific user-network to send a context-based response to an information request. Method 400 is described by way of example as being carried out by a server, such as server 202 of FIG. 2. However, it should be understood that method 400 or portions thereof may be carried out by other devices and/or systems without departing from the scope of the invention.

As shown by block 402, method 400 involves a server receiving data that corresponds to an information request, where the information request is associated with a first user-profile. In an exemplary embodiment, the information request may be associated with the first user-profile directly (e.g., by identification of the first user-profile in the information request) and/or indirectly (e.g., by first identifying the computing device from which the request is received, and then determining that the first user-profile is associated with the computing device). In either case, the server may determine a context of the information request, as shown by block 404. The server may then determine a context-specific social network for the first user-profile, which includes one or more surrogates user profiles in the context of the information request, as shown by block 406. Once the server determines the context-specific user-network, the server may use historical context-to-action data for one or more of the surrogate user-profiles as a basis for determining a context-based response to the information request, as shown by block 408. The server may then send the context-based response to a computing device associated with the first user-profile, as shown by block 410.

As in other exemplary methods, the context-specific user-network may include one or more user-profiles that are surrogates for the first user-profile in a certain context. In method 400, however the surrogates are determined specifically for the context of the information request. For example, if the user is searching for information, such as via a search engine, the context may be derived at least in part from the type of information being searched for. Other examples are also possible.

IX. Exemplary Systems and Devices

Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 5A:
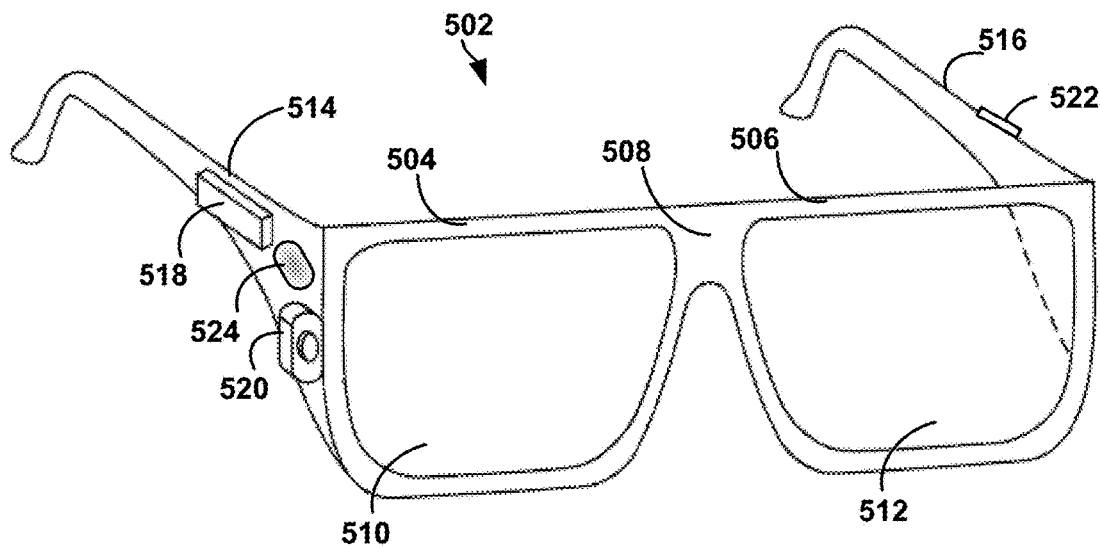
FIG. 5A illustrates a wearable computing system according to an exemplary embodiment.

FIG. 5A illustrates a wearable computing system according to an exemplary embodiment. In FIG. 5A, the wearable computing system takes the form of a head-mounted device (HMD) 502 (which may also be referred to as a head-mounted display). It should be understood, however, that exemplary systems and devices may take the form of or be implemented within or in association with other types of devices, without departing from the scope of the invention. As illustrated in FIG. 5A, the head-mounted device 502 comprises frame elements including lens-frames 504, 506 and a center frame support 508, lens elements 510, 512, and extending side-arms 514, 516. The center frame support 508 and the extending side-arms 514, 516 are configured to secure the head-mounted device 502 to a user's face via a user's nose and ears, respectively.

Each of the frame elements 504, 506, and 508 and the extending side-arms 514, 516 may be formed of a solid structure of plastic and/or metal, or may be formed of a hollow structure of similar material so as to allow wiring and component interconnects to be internally routed through the head-mounted device 502. Other materials may be possible as well.

One or more of each of the lens elements 510, 512 may be formed of any material that can suitably display a projected image or graphic. Each of the lens elements 510, 512 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 514, 516 may each be projections that extend away from the lens-frames 504, 506, respectively, and may be positioned behind a user's ears to secure the head-mounted device 502 to the user. The extending side-arms 514, 516 may further secure the head-mounted device 502 to the user by extending around a rear portion of the user's head. Additionally or alternatively, for example, the HMD 502 may connect to or be affixed within a head-mounted helmet structure. Other possibilities exist as well.

The HMD 502 may also include an on-board computing system 518, a video camera 520, a sensor 522, and a finger-operable touch pad 524. The on-board computing system 518 is shown to be positioned on the extending side-arm 514 of the head-mounted device 502; however, the on-board computing system 518 may be provided on other parts of the head-mounted device 502 or may be positioned remote from the head-mounted device 502 (e.g., the on-board computing system 518 could be wire- or wirelessly-connected to the head-mounted device 502). The on-board computing system 518 may include a processor and memory, for example. The on-board computing system 518 may be configured to receive and analyze data from the video camera 520 and the finger-operable touch pad 524 (and possibly from other sensory devices, user interfaces, or both) and generate images for output by the lens elements 510 and 512.

The video camera 520 is shown positioned on the extending side-arm 514 of the head-mounted device 502; however, the video camera 520 may be provided on other parts of the head-mounted device 502. The video camera 520 may be configured to capture images at various resolutions or at different frame rates. Many video cameras with a small form-factor, such as those used in cell phones or webcams, for example, may be incorporated into an example of the HMD 502.

Further, although FIG. 5A illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown on the extending side-arm 516 of the head-mounted device 502; however, the sensor 522 may be positioned on other parts of the head-mounted device 502. The sensor 522 may include one or more of a gyroscope or an accelerometer, for example. Other sensing devices may be included within, or in addition to, the sensor 522 or other sensing functions may be performed by the sensor 522.

The finger-operable touch pad 524 is shown on the extending side-arm 514 of the head-mounted device 502. However, the finger-operable touch pad 524 may be positioned on other parts of the head-mounted device 502. Also, more than one finger-operable touch pad may be present on the head-mounted device 502. The finger-operable touch pad 524 may be used by a user to input commands. The finger-operable touch pad 524 may sense at least one of a position and a movement of a finger via capacitive sensing, resistance sensing, or a surface acoustic wave process, among other possibilities. The finger-operable touch pad 524 may be capable of sensing finger movement in a direction parallel or planar to the pad surface, in a direction normal to the pad surface, or both, and may also be capable of sensing a level of pressure applied to the pad surface. The finger-operable touch pad 524 may be formed of one or more translucent or transparent insulating layers and one or more translucent or transparent conducting layers. Edges of the finger-operable touch pad 524 may be formed to have a raised, indented, or roughened surface, so as to provide tactile feedback to a user when the user's finger reaches the edge, or other area, of the finger-operable touch pad 524. If more than one finger-operable touch pad is present, each finger-operable touch pad may be operated independently, and may provide a different function.

Figure 5B:
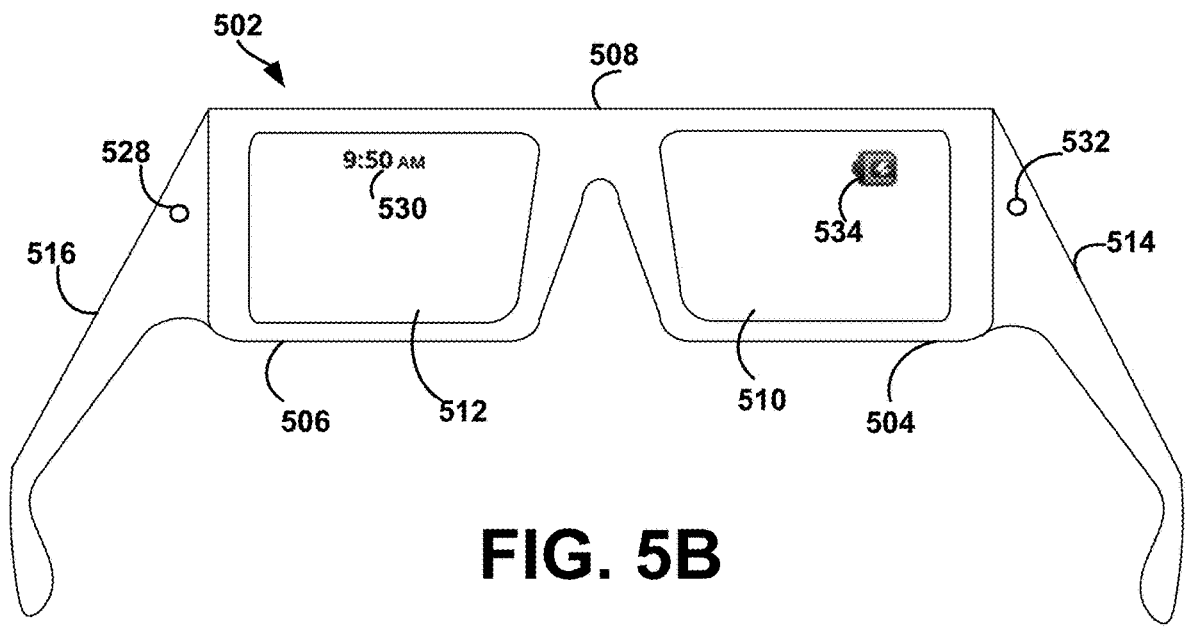
FIG. 5B illustrates an alternate view of the wearable computing device illustrated in FIG. 5A.

FIG. 5B illustrates an alternate view of the wearable computing device illustrated in FIG. 5A. As shown in FIG. 5B, the lens elements 510, 512 may act as display elements. The head-mounted device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510, 512 may act as a combiner in a light projection system and may include a coating that reflects the light projected onto them from the projectors 528, 532. In some embodiments, a reflective coating may not be used (e.g., when the projectors 528, 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504, 506 for driving such a matrix display. Alternatively or additionally, a laser or LED source and scanning system could be used to draw a raster display directly onto the retina of one or more of the user's eyes. Other possibilities exist as well.

Figure 6A:
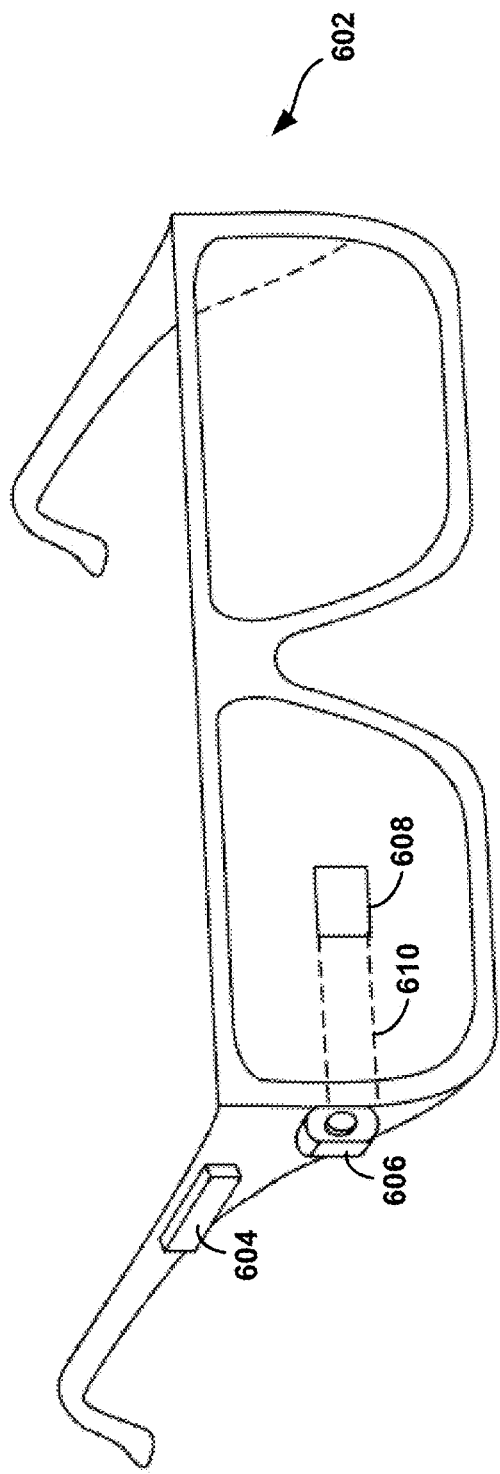
FIG. 6A illustrates another wearable computing system according to an exemplary embodiment, which takes the form of an HMD.

FIG. 6A illustrates another wearable computing system according to an exemplary embodiment, which takes the form of an HMD. The HMD 602 may include frame elements and side-arms such as those described with respect to FIGS. 5A and 5B. The HMD 602 may additionally include an on-board computing system 604 and a video camera 606, such as those described with respect to FIGS. 5A and 5B. The video camera 606 is shown mounted on a frame of the HMD 602. However, the video camera 606 may be mounted at other positions as well.

As shown in FIG. 6A, the HMD 602 may include a single display 608 which may be coupled to the device. The display 608 may be formed on one of the lens elements of the HMD 602, such as a lens element described with respect to FIGS. 5A and 5B, and may be configured to overlay computer-generated graphics in the user's view of the physical world. The display 608 is shown to be provided in a center of a lens of the HMD 602, however, the display 608 may be provided in other positions. The display 608 is controllable via the computing system 604 that is coupled to the display 608 via an optical waveguide 610.

Figure 6B:
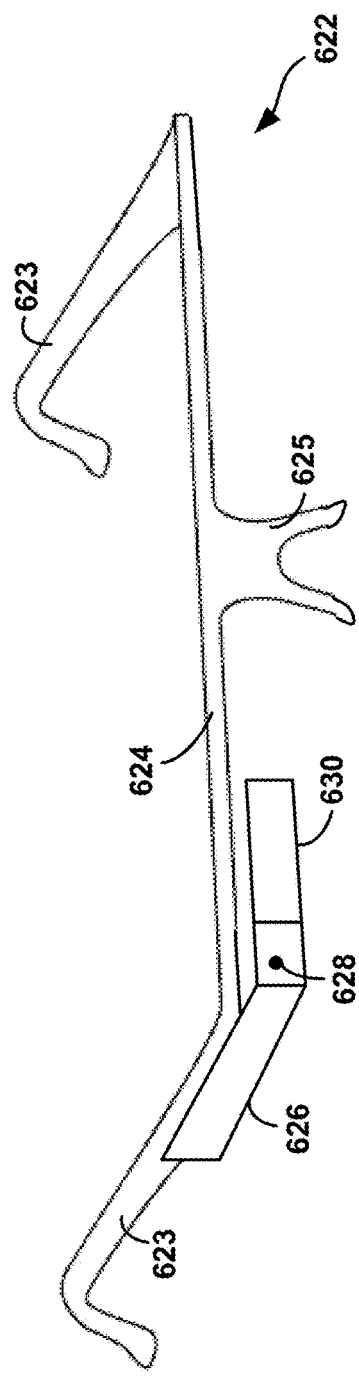
FIG. 6B illustrates another wearable computing system according to an exemplary embodiment, which takes the form of an HMD.

FIG. 6B illustrates another wearable computing system according to an exemplary embodiment, which takes the form of an HMD. The HMD 622 may include side-arms 623, a center frame support 624, and a bridge portion with nosepiece 625. In the example shown in FIG. 6B, the center frame support 624 connects the side-arms 623. The HMD 622 does not include lens-frames containing lens elements. The HMD 622 may additionally include an on-board computing system 626 and a video camera 628, such as those described with respect to FIGS. 5A and 5B.

The HMD 622 may include a single lens element 630 that may be coupled to one of the side-arms 623 or the center frame support 624. The lens element 630 may include a display such as the display described with reference to FIGS. 5A and 5B, and may be configured to overlay computer-generated graphics upon the user's view of the physical world. In one example, the single lens element 630 may be coupled to the inner side (i.e., the side exposed to a portion of a user's head when worn by the user) of the extending side-arm 623. The single lens element 630 may be positioned in front of or proximate to a user's eye when the HMD 622 is worn by a user. For example, the single lens element 630 may be positioned below the center frame support 624, as shown in FIG. 6B.

FIG. 7 illustrates a schematic drawing of a computing device according to an exemplary embodiment. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mounted devices 502, 602, or 622 described with reference to FIGS. 1-3B.

Thus, the device 710 may include a display system 712 comprising a processor 714 and a display 716. The display 710 may be, for example, an optical see-through display, an optical see-around display, or a video see-through display. The processor 714 may receive data from the remote device 730, and configure the data for display on the display 716. The processor 714 may be any type of processor, such as a micro-processor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc. The remote device 730 may also be a server, such as server 202 of FIG. 2B. The remote device 730 may take other forms as well.

In FIG. 7, the communication link 720 is illustrated as a wireless connection; however, wired connections may also be used. For example, the communication link 720 may be a wired serial bus such as a universal serial bus or a parallel bus. A wired connection may be a proprietary connection as well. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 730 may be accessible via the Internet and may include a computing cluster associated with a particular web service (e.g., social-networking, photo sharing, address book, etc.).

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented method comprising:
   determining a context associated with a first user-profile;
   determining one or more user-attributes that correspond to the determined context;
   evaluating each of the one or more determined user-attributes for the first user-profile and separately for each of a plurality of candidate user profiles;
   determining a context-specific user-network for the first user-profile, wherein the context-specific user-network comprises one or more user-profiles selected from the plurality of candidate user profiles to be surrogate user-profiles for the first user-profile in the determined context, wherein each surrogate user-profile is selected based on similarity between at least one evaluated user-attribute for the first user-profile and at least one corresponding evaluated user-attribute for the surrogate user profile;
   using historical context-to-action data for one or more of the surrogate user-profiles as a basis for determining a context-based action that is appropriate in the determined context, wherein the historical context-to-action data that is more recent is given greater weight; and
   causing a computing device associated with the first user-profile to initiate the context-based action.

2. The method of claim 1, wherein the context-specific user-network is an inferred network comprising at least one surrogate user-profile that is not pre-associated with the first user-profile.

3. The method of claim 1, wherein determining the context associated with the first user-profile comprises determining a context associated with a computing device, wherein the computing device is associated with the first user-profile.

4. The method of claim 1, wherein the first user-profile is a user profile associated with a user-account on a social network.

5. The method of claim 1, wherein the context associated with the first user-profile is determined based on one or more context signals, wherein the one or more context signals comprise one or more of the following: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with the user-profile, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a device, (v) items that are currently detected by a device, (w) items that have been detected in the past by the device, (x) items that other devices associated with a device are currently in communication with or have communicated with in the past, (y) information derived from cross-referencing any two or more of: information on a user's calendar, information available via a user's social networking account, and/or other context signals or sources of context information, (z) health statistics or characterizations of a user's current health, and (aa) a user's recent context as determined from sensors on or near the user and/or other sources of context information.

6. The method of claim 1, further comprising:
based at least in part on the determined context, determining one or more context-specific relationships between evaluated user-attributes to use in selecting the one or more surrogate user-profiles.

7. The method of claim 1, wherein determining the context-based action that is appropriate in the determined context comprises:
using the historical context-to-action data for one or more of the surrogate user-profiles as a basis for determining a probability that a candidate action is correct for the first user-profile in the determined context; and
based on the probability that the candidate action is correct for the first user-profile in the determined context, selecting the candidate action as the context-based action that is appropriate in the determined context.

8. The method of claim 7, wherein the candidate action is selected as the context-based action that is appropriate in the determined context in response to determining that the probability that the candidate action is correct is greater than a threshold probability.

9. The method of claim 1, wherein determining the context-based action that is appropriate in the determined context comprises:
determining one or more candidate actions, wherein the historical context-to-action data indicates that at least one past instance of the candidate action in the determined context is associated with at least one surrogate user-profile;
determining a rating for each of the candidate actions; and
selecting at least one highest-ranking candidate action as the context-based action that is appropriate in the determined context in the determined context.

10. The method of claim 9, wherein the rating for a given one of the candidate actions is based on feedback data indicating correctness of the past instances of the candidate action in the determined context.

11. The method of claim 9, further comprising:
determining data for the one or more user-attributes from the first user-profile; and
for at least a given one of the candidate actions:
determining a correlation between the data for the one or more user-attributes from the first user-profile and corresponding data for the one or more user-attributes from the at least one surrogate user-profile that is associated with the at least one past instance of the given candidate action; and
using the determined correlation as a basis for determining the rating for the given candidate action.

12. The method of claim 1, wherein using the historical context-to-action data as a basis for determining the context-based action comprises:
determining one or more candidate actions, wherein the historical context-to-action data indicates that each candidate action has been initiated in association with at least one of the surrogate user-profiles in the determined context; and
selecting at least one of the candidate actions as the context-based action that is appropriate in the determined context.

13. The method of claim 1, wherein using the historical context-to-action data as a basis for determining the context-based action comprises:
determining one or more candidate actions, wherein the historical context-to-action data indicates that each candidate action has been initiated in association with at least one of the surrogate user-profiles in the determined context;
ranking the candidate actions; and
selecting a highest-ranking candidate action as the context-based action that is appropriate in the determined context in the determined context.

14. The method of claim 13, wherein ranking the candidate actions comprises:
for each of the candidate actions, using the historical context-to-action data for one or more of the surrogate user-profiles as a basis for determining a probability that the candidate action is correct for the first user-profile in the determined context; and
ranking the candidate actions according to the respective probability that each candidate action is correct for the first user-profile in the determined context.

15. The method of claim 14, wherein ranking the candidate actions comprises:
for each of the candidate actions, using the historical context-to-action data for one or more of the surrogate user-profiles as a basis for determining a confidence factor for the candidate action; and
ranking the candidate actions according to the respective confidence factor for each candidate action.

16. The method of claim 1, wherein the context-based action comprises a home-automation action, and wherein initiating the first action comprises sending an instruction message to at least one home electronic device.

17. The method of claim 16, wherein the at least one home electronic device comprises at least one of the following: (a) a home appliance, (b) a refrigerator, (c) a microwave, (d) a dishwasher, (e) a freezer, (f) a washer, (g) a dryer, (h) a combination washer and dryer, (i) a television, (j) a home stereo unit, (k) a laptop computer, (l) a desktop computer, (m) a tablet computer, (n) a smartphone, (o) a garage door opener, (p) a home security system, (q) a home-automation control system, (r) a heating appliance, (s) a cooling appliance, and (t) a cooking appliance.

18. The method of claim 16, wherein the first action comprises an action that adjusts a user-interface of the at least one home-electronic device.

19. The method of claim 1, wherein the first action comprises at least one calendar action.

20. The method of claim 19, wherein the at least one calendar action comprises at least one of the following: (a) creating a calendar entry, (b) deleting an existing calendar entry, (c) updating an existing calendar entry, (d) setting a reminder for a calendar entry, (e) creating a meeting entry, (f) deleting an existing meeting entry, (g) updating an existing meeting entry, (h) sending one or more invitations for a meeting entry, (i) withdrawing one or more invitations for a meeting entry, (j) setting a reminder for a meeting entry, (k) creating a task entry, (l) deleting a task entry, (m) updating a task entry, and (n) setting a reminder for a task entry.

21. The method of claim 1, wherein the first action comprises an adjustment to a user-interface of the computing device.

22. The method of claim 1, further comprising:
sending a context-request message to a computing device associated with the first user-profile, wherein the context-request message requests additional context data;
receiving the requested additional context data; and
using the additional context data to update the determined context for the first user-profile.

23. A computing system comprising:
a non-transitory computer-readable medium; and
program instructions stored on the non-transitory computer-readable medium and executable by at least one processor to:
determine a context associated with a computing device, wherein the computing device is associated with a first user-profile, and wherein the first user-profile is associated with a social network;
determine one or more user-attributes that correspond to the determined context;
evaluate each of the one or more determined user-attributes for the first user-profile and separately for each of a plurality of candidate user profiles;
determine a context-specific user-network for the first user-profile, wherein the context-specific user-network comprises one or more user-profiles selected from the plurality of candidate user profiles to be surrogates for the first user-profile in the determined context, wherein each surrogate user-profile is selected based on similarity between at least one evaluated user-attribute for the first user-profile and at least one corresponding evaluated user-attribute for the surrogate user profile;

use historical context-to-action data for one or more of the surrogate user-profiles as a basis to determine a context-based action that is appropriate in the determined context wherein the historical context-to-action data that is more recent is given greater weight; and cause a computing device associated with the first user-profile to initiate the context-based action.

24. A computer-implemented method comprising:

receiving an information request that is associated with a first user-profile;

determining a context of the information request;

determining one or more user-attributes that correspond to the determined context;

evaluating each of the one or more determined user-attributes for the first user-profile and separately for each of a plurality of candidate user profiles;

determining a context-specific user-network for the first user-profile, wherein the context-specific user-network comprises one or more user-profiles selected from the plurality of candidate user profiles to be surrogates for the first user-profile in the context of the information request, wherein each surrogate user-profile is selected based on similarity between at least one evaluated user-attribute for the first user-profile and at least one corresponding evaluated user-attribute for the surrogate user profile;

using historical context-to-action data for one or more of the surrogate user-profiles as a basis for determining a context-based response to the information request that is appropriate in the context of the information request, wherein the historical context-to-action data that is more recent is given greater weight; and sending the context-based response to a computing device associated with the first user-profile.

* * * * *